US012800011B2

(12) United States Patent
Bojsen

(10) Patent No.: US 12,800,011 B2
(45) Date of Patent: Nov. 17, 2026

(54) REVERSIBLE BELT DRIVE SYSTEM

(71) Applicant: AGCO International GmbH, Neuhausen (CH)

(72) Inventor: Thomas Smed Bojsen, Randers (DK)

(73) Assignee: AGCO International GmbH, Neuhausen (CH)

(*) Notice: Subject to any disclaimer, the term of this patent is extended or adjusted under 35 U.S.C. 154(b) by 376 days.

(21) Appl. No.: 18/539,488

(22) Filed: Dec. 14, 2023

(65) Prior Publication Data

US 2024/0218916 A1 Jul. 4, 2024

(30) Foreign Application Priority Data

Dec. 30, 2022 (GB) ...................................... 2219845

(51) Int. Cl.

*F16H 7/12* (2006.01)
*A01D 41/12* (2006.01)
*F16H 7/08* (2006.01)

(52) U.S. Cl.

CPC ........... *F16H 7/1263* (2013.01); *A01D 41/12* (2013.01); *F16H 7/1281* (2013.01); *F16H 2007/0806* (2013.01); *F16H 2007/0812* (2013.01); *F16H 2007/0865* (2013.01); *F16H 2007/0891* (2013.01); *F16H 2007/0893* (2013.01); *F16H 2007/0897* (2013.01)

(58) Field of Classification Search

CPC ................. F16H 7/1263; F16H 7/1281; F16H 2007/0812; F16H 2007/0865; F16H 2007/0891; F16H 2007/0893; F16H 2007/0897; A01D 41/12

See application file for complete search history.

(56) References Cited

U.S. PATENT DOCUMENTS

| | | | | |
|---|---|---|---|---|
| 3,824,864 A * | 7/1974 | Muller | A01D 41/12 474/33 |
| 10,299,436 B2 | 5/2019 | Bailliu et al. | |
| 2017/0059014 A1* | 3/2017 | Bailliu | F16H 7/0827 |
| 2019/0055993 A1* | 2/2019 | Pautz | A01D 41/1243 |

FOREIGN PATENT DOCUMENTS

| | | |
|---|---|---|
| DE | 102017115948 A1 | 1/2019 |
| EP | 2574227 B1 | 2/2015 |
| EP | 3848616 * | 7/2021 |
| EP | 3848616 A1 | 7/2021 |

OTHER PUBLICATIONS

UK Intellectual Property Office, Search Report for GB Application No. GB2219845.1 dated Jun. 29, 2022, 3 pages.

* cited by examiner

*Primary Examiner* — Minh Truong
*Assistant Examiner* — Mark K Buse
(74) *Attorney, Agent, or Firm* — Corporation

(57) ABSTRACT

A reversible drive belt system comprises a drive belt, a forward direction drive motor, and a reverse direction hydraulic drive motor. A belt tensioning element has a force applied to it by a first tensioning system and a second tensioning system in the form of a hydraulic cylinder. When the drive system is operated in the reverse direction, an input hydraulic pressure to the hydraulic cylinder is controlled in dependence on a load on the hydraulic motor.

6 Claims, 6 Drawing Sheets

REVERSIBLE BELT DRIVE SYSTEM

CROSS-REFERENCE TO RELATED APPLICATION

This application claims the benefit of the filing date of United Kingdom Patent Application 2219845.1, “Reversible Belt Drive System,” filed Dec. 30, 2022, the entire disclosure of which is incorporated herein by reference.

FIELD

Embodiments of the present disclosure relate generally to belt drive systems, and in particular belt drive systems which can be reversed, for example to clear a blockage of the material carried by the belt. The systems are for example of interest for use in combine harvesters, for example for driving the beater system for delivering crop material to the threshing system of the combine harvester.

BACKGROUND

A combine harvester typically includes a crop cutting head (the “header”) and a threshing system for detaching grains of cereal from the ears of cereal. In some examples, a delivery system delivers the cut crop to the threshing system via a beater cylinder. The delivery system is known as the feederhouse. A separating apparatus is downstream of the threshing system, and a grain cleaning apparatus receives grain from the separating apparatus. A stratification pan aims to stratify the material into a layered structure of grain at the bottom and light chaff and other material other than grain (MOG) at the top.

There are various designs for the threshing system and for the separating apparatus (e.g., axial or transverse) as well as for the grain cleaning apparatus. However, in all designs, there is a flow of material from the feederhouse to the threshing system, then to the separating apparatus. Material is delivered from the separating apparatus to a grain cleaning unit, in particular from a stratification pan of the separating apparatus to the grain cleaning unit.

The threshing system typically comprises threshing rotors that rotate with respect to concave gratings (known simply as “concaves”). As mentioned above, the threshing rotors may be arranged transversally or longitudinally with respect to the direction of travel of the combine harvester.

The beater is typically a belt-driven cylinder that is driven in one direction, to transfer the cut crop to the threshing system. It is known to enable the beater to be driven in reverse. If a blockage occurs, the beater is driven in reverse to perform an unblocking function. However, there is a problem that when the beater is reversed, the belt that drives the beater loses tension and will eventually slip when the driving torque is too high.

It has been proposed in European Patent Application EP3848616, “Belt Drive and Method for Operating a Belt Drive,” published Jul. 14, 2021, to use a belt tensioning arrangement to prevent slippage when a belt drive direction is reversed. Belt tension is increased when the belt is driven in reverse compared to when the belt is driven forward. However, because different loads may be present at the belt drive motor, the belt tension may be too high, or else it may be too low so that slippage may still occur, depending on the load that is present. The control of the belt tension is also complicated, requiring sensors and control logic. There is a need for an improved and simplified tensioning arrangement for a reversible belt drive.

BRIEF SUMMARY

Some embodiments include a reversible drive belt system comprising a drive belt; a drive motor arrangement comprising a forward direction drive motor and a reverse direction drive motor, wherein the reverse direction drive motor comprises a hydraulic drive motor; a belt tensioning element; a first tensioning system for applying force to the belt tensioning element to apply a tensioning force to the drive belt; a second tensioning system for applying force to the belt tensioning element to apply a tensioning force to the drive belt, the second tensioning element comprising a hydraulic cylinder. The hydraulic cylinder is actuated by an input hydraulic pressure. When the drive system is operated in the reverse direction, the input hydraulic pressure to the hydraulic cylinder is controlled in dependence on the load on the hydraulic motor.

This drive belt system can be driven in reverse using a hydraulic motor. In order to maintain a suitable tension on the belt, a tensioning system is used. The tensioning system applies a different force in the forward belt drive direction than in the reverse belt drive direction. A first tensioning system is used for the forward direction, and an additional force is provided by a second tensioning system only in the reverse belt direction. The force applied by the second tensioning system (thus the additional tensioning force applied when the belt is driven in the reverse direction) is adapted in response to the load on the hydraulic motor. In this way, the belt is tensioned more forcefully if there is a blockage which presents a significant load to the hydraulic motor, and it tensioned less forcefully when there is a lighter load. This provides a dynamically variable tensioning force when in reverse drive, which enables belt slip to be prevented while also avoiding excessive belt wear or power consumption by over-tensioning the drive belt.

The first tensioning system may comprise a spring system. The spring system may apply an essentially static force (although depending on the spring compression or extension), but a pre-bias level may be configured before use. The spring system enables slack to be taken up from the belt as well as an additional tensioning force to be applied. Other tensioning systems may instead be used for providing the tensioning force in the forward belt drive direction.

When the drive system is operated in the forward direction, the first tensioning system only applies the tensioning force. When the drive system is operated in the reverse direction, the combination of the first and second tensioning systems apply the tensioning force. Thus, the second tensioning system provides an added tensioning force for use when the belt is driven in the reverse direction.

When the drive system is operated in the reverse direction, the input hydraulic pressure is for example proportional to the load on the hydraulic motor.

The hydraulic drive motor may comprise a hydraulic pressure supply line, wherein when the drive system is operated in the reverse direction, the input hydraulic pressure is coupled to the hydraulic pressure supply line of the hydraulic motor. This provides a particularly simple implementation of tension control in dependence on the hydraulic motor load, avoiding the need for any sensing or complicated controller and actuator system.

The hydraulic drive motor may comprise a return line, wherein when the drive system is operated in the forward direction, the hydraulic pressure supply line of the hydraulic motor is coupled to the return line. Thus, when operating in the forward direction, no additional tensioning force is applied by the hydraulic cylinder. The belt tensioning system may then apply a purely mechanical tensioning force.

The reversible drive belt system may be used for driving a beater cylinder of a combine harvester. The beater cylinder may be driven in reverse (as well as other parts of the processing system of the combine harvester) to clear a blockage in the process flow.

In some embodiments, a combine harvester comprises a crop cutting head, a feederhouse, a beater cylinder, the drive belt system defined above for driving the beater cylinder, a threshing system for receiving material from the beater cylinder, a separating system, and a grain cleaning system for receiving cut and threshed crop material.

BRIEF DESCRIPTION OF THE DRAWINGS

Embodiments will now be described, by way of example only, with reference to the accompanying drawings, in which.

DETAILED DESCRIPTION

Figure 1:
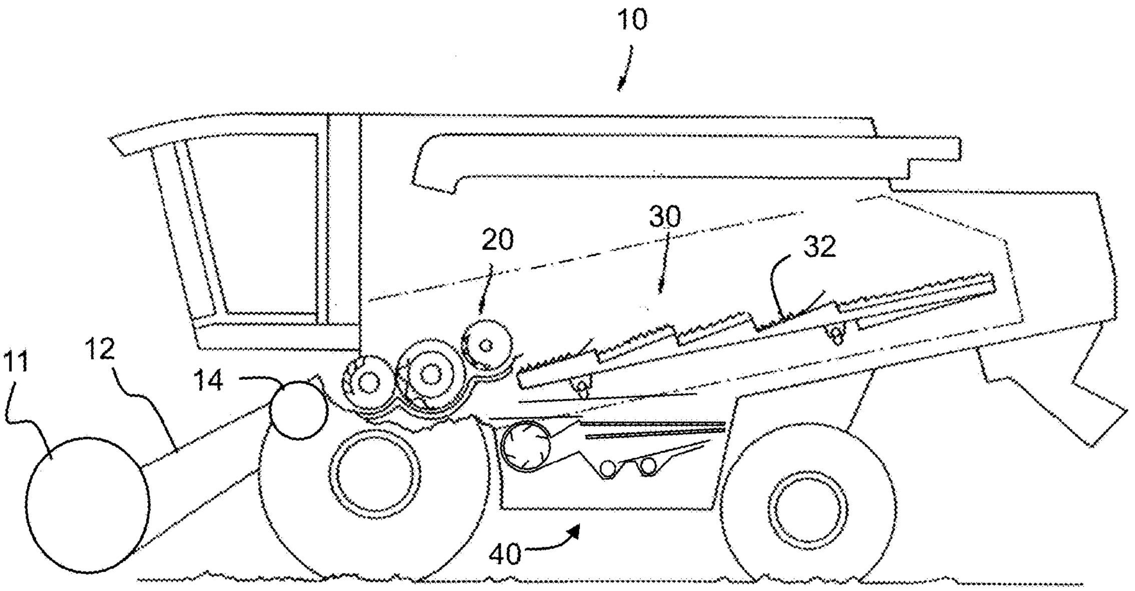
FIG. 1 shows a combine harvester.

The disclosure references the figures. It should be understood that the detailed description and specific examples, while indicating exemplary embodiments of the apparatus, systems and methods, are intended for purposes of illustration only and are not intended to limit the scope of the claims. These and other features, aspects, and advantages of the apparatus, systems and methods disclose will become better understood from the following description, appended claims, and accompanying drawings. It should be understood that the figures are merely schematic and are not drawn to scale. It should also be understood that the same reference numerals are used throughout the figures to indicate the same or similar parts.

This disclosure relates to a reversible belt drive. It may be used with any belt that can be driven in reverse. The disclosure will be described with reference to a particular belt drive of a beater for delivering crop material to the threshing system of a combine harvester. However, it will be understood that other applications are also envisaged, as discussed below.

According to this disclosure, a reversible drive belt system comprises a drive belt, a forward direction drive motor, and a reverse direction hydraulic drive motor. A belt tensioning element has a force applied to it by a first tensioning system and a second tensioning system in the form of a hydraulic cylinder. When the drive system is operated in the reverse direction, an input hydraulic pressure to the hydraulic cylinder is controlled in dependence on the load on the hydraulic motor.

FIG. 1 shows a combine harvester 10 to which the disclosure may be applied. A crop cutting head 11 (known as the header) for example comprises a wide laterally extending transverse auger, which cuts the crop material and drives it inwardly towards a central area. A front elevator housing 12 receives the cut crop material and includes a beater cylinder 14 for transferring the cut crop material onto a feederhouse, which transports the crop material towards the downstream processing parts.

The feederhouse delivers the crop material to a threshing system 20 for detaching grains of cereal from the ears of cereal, and a separating apparatus 30 which is connected downstream of the threshing system 20. The threshing system comprises one or more threshing units, in particular rotors, and associated concaves.

In the example shown, the separating apparatus 30 includes a plurality of parallel, longitudinally-aligned, straw walkers 32, and this is suitable for the case of a so-called straw-walker combine. The grains pass to a grain cleaning apparatus 40 after separation by the separating device 30.

In the example shown, the threshing system 20 is a tangential-flow 'conventional' threshing system, i.e., formed by rotating elements with an axis of rotation in the side-to-side direction of the combine harvester and for generating a tangential flow. For example, the 'conventional' threshing system includes a rotating, tangential-flow, threshing cylinder and a concave-shaped grate. The threshing cylinder includes rasp bars that act upon the crop stream to thresh the grain or seeds from the remaining material, the majority of the threshed grain passing through the underlying grate and onto a stratification pan (also sometimes known as the grain pan).

There are also axial threshing systems, i.e., formed by rotating elements with an axis of rotation in the longitudinal direction (direction of travel). For example, the threshing section may have axially-aligned rasp bars spaced around the front section, and the separating section may have separating elements or fingers arranged in a pattern, e.g., a spiral pattern, extending from the rasp bars to the rear of the rotor.

Figure 2:
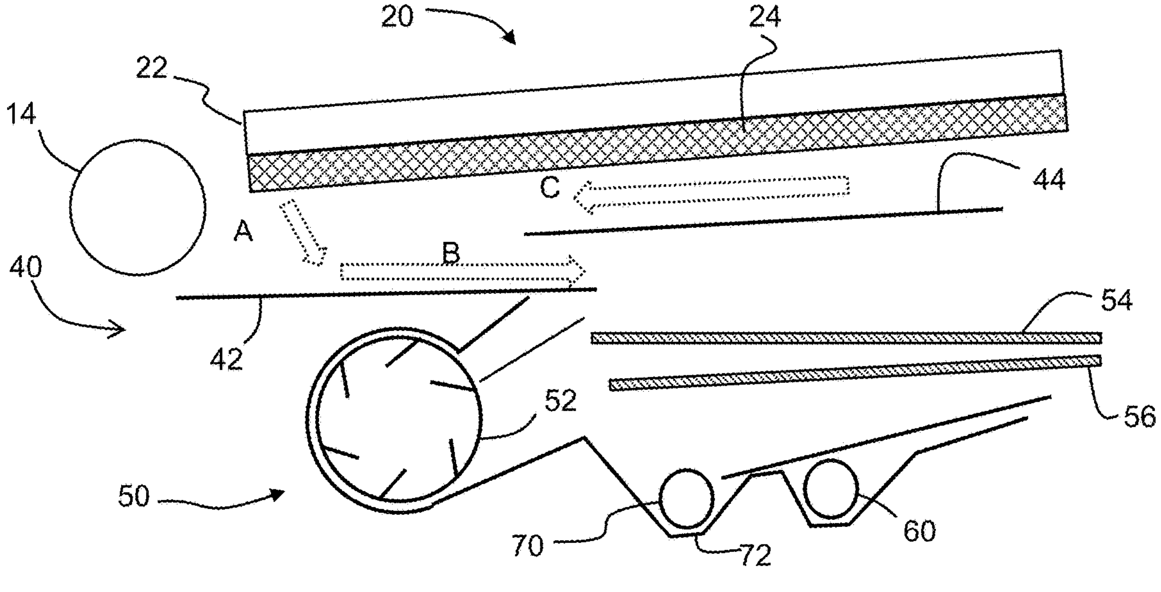
FIG. 2 shows one example of threshing system and grain cleaning apparatus in more detail.

By way of example, an axial threshing (and separating) system 20 is shown in FIG. 2, together with a cleaning apparatus 40.

Crop material is delivered to the threshing system by the beater cylinder 14. The threshing system 20 in this example comprises an axial rotor 22 beneath which is mounted the concave 24. The concave may have different sections along its length. The separating function involves conveying the crop stream rearwardly in a ribbon passing along a spiral path. There may be two axial rotors in parallel and counter-rotating.

The initial threshing creates a flow of grain to a stratification pan 42. The separating function further downstream of the threshing system serves to separate further grain from the crop stream, and this separated grain passes through a grate-like structure onto an underlying return pan 44. The residue crop material, predominantly made up of straw, exits the machine at the rear. A straw spreader and/or chopper may be provided to process the straw material as required.

The threshing apparatus 20 does not remove all material other than grain ("MOG") from the grain, so the crop stream collected by the stratification pan 42 and return pan 44 typically includes a proportion of straw, chaff, tailings, and other unwanted material such as weed seeds, bugs, and tree twigs. The remainder of the grain cleaning apparatus 40 is in the form of a grain cleaning unit 50. The grain cleaning unit 50 removes this unwanted material, leaving a clean sample of grain to be delivered to the tank.

The grain cleaning unit 50 comprises a fan unit 52 and sieves 54 and 56. The upper sieve 54 is known as the chaffer.

The stratification pan 42 and return pan 44 are driven in an oscillating manner to convey the grain and MOG accordingly. Although the drive and mounting mechanisms for the stratification pan 42 and return pan 44 are not shown, it should be appreciated that this aspect is well known in the art of combine harvesters. Furthermore, it should be appreciated that the two pans 42, 44 may take a ridged construction as is known in the art.

The general flow of material is as follows. The grain passing through the concave 24 falls onto the front of stratification pan 42 as indicated by arrow A in FIG. 2. This material is conveyed rearwardly (in the direction of arrow B in FIG. 2) by the oscillating motion of the stratification pan 42 and the ridged construction thereof. Material passing through the concave further back falls onto the return pan 44 and is conveyed forwardly by the oscillating motion and ridged construction thereof as shown by arrow C.

It is noted that "forwardly" and "rearwardly" refer to direction relative to the normal forward direction of travel of the combine harvester.

When the material reaches a front edge of the return pan 44, it falls onto the stratification pan 42 and is conveyed as indicated by arrow B.

The combined crop streams thus progress rearwardly towards a rear edge of the stratification pan 42. While the crop stream, including grain and MOG, is conveyed across the stratification pan 42, it undergoes stratification wherein the heavier grain sinks to the bottom layers adjacent stratification pan 42 and the lighter and/or larger MOG rises to the top layers.

Upon reaching the rear edge of the stratification pan 42, the crop stream falls onto the chaffer 54, which is also driven in a fore-and-aft oscillating motion. The chaffer 54 is of a known construction and includes a series of transverse ribs or louvers that create open channels or gaps therebetween. The chaffer ribs are angled upwardly and rearwardly so as to encourage MOG rearwardly while allowing the heavier grain to pass through the chaffer onto an underlying second sieve 56.

The chaffer 54 is coarser (with larger holes) than second sieve 56. Grain passing through chaffer 54 is incident on the lower sieve 56 which is also driven in an oscillating manner and serves to remove tailings from the stream of grain before being conveyed to an on-board tank by grain collecting auger 70 that resides in a transverse trough 72 at the bottom of the grain cleaning unit 50. Tailings blocked by sieve 56 are conveyed rearwardly by the oscillating motion thereof to a rear edge from where the tailings are directed to the returns auger 60 for reprocessing.

This disclosure relates to a belt drive system, such as for driving the beater cylinder, for delivering crop material to the threshing and separating systems. It may be used in a conventional (transverse) machine, an axial machine, or a hybrid machine (with transverse threshing and axial separation).

Figure 3:
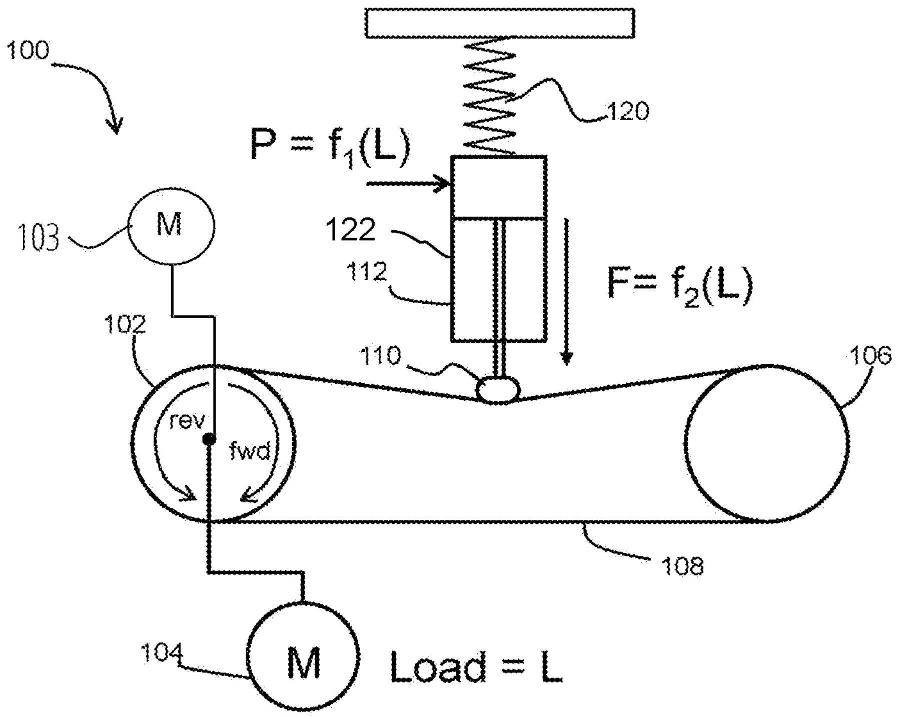
FIG. 3 shows a belt drive system.

FIG. 3 shows a belt drive system 100 comprising a drive roller 102 driven by a motor arrangement, including a main motor 103 for forward driving a drive belt 108 (e.g., a diesel engine of the combine harvester) and also a hydraulic motor 104 for rearward driving the drive belt. A driven roller 106 is coupled to the drive roller 102 by the drive belt 108. The driven roller 106 is coupled to the beater cylinder. Thus, a drive torque is transferred from the drive roller 102 to the driven roller 106 by the belt 108. The belt is tensioned by a belt tensioning element 110. A first tensioning system 120 is used to apply force to the belt tensioning element 110 to apply a tensioning force to the drive belt. In the example shown, the first tensioning system 120 comprises a spring system for urging the tensioning element 110 towards the belt to take up slack and to apply a tensioning force. However, any suitable system may be used for applying a tensioning force. The amount of compression or extension of the spring used by the first tensioning system 120 will be a function of the amount of slack in the belt and the resistance provided by the belt.

A second tensioning system 122 is also used for applying force to the belt tensioning element thereby to apply a tensioning force F to the drive belt 108. The second tensioning element comprises a hydraulic cylinder 112 actuated by an input hydraulic pressure P.

The first tensioning system 120 is used when the belt is operated in the forward direction, and no additional tensioning force is delivered by the second tensioning system. For example, the pressures are equalized on opposite sides of the hydraulic piston so the piston fully retracts and the hydraulic cylinder functions as a rigid rod. When the belt is operated in the reverse direction, the second tensioning system provides an additional tensioning force by applying a pressure difference across the piston. During reverse driving, the spring of the first tensioning system 120 is for example at full extension or compression, i.e., already providing its maximum tensioning force.

The hydraulic cylinder is actuated by an input hydraulic pressure P. When the belt drive system is operated in a reverse direction, the input hydraulic pressure P is controlled in dependence on the load L on the hydraulic motor, hence the force F applied to the belt (in particular the additional force provided by the second tensioning system) is controlled in dependence on the load L.

The drive roller 102 is driven in one direction "fwd" by the main motor, and the first tensioning system applies a tensioning force to the slack side of the belt. At this time, the hydraulic cylinder 112 is not contributing to the tensioning force. The forward drive motor may be, for example, a diesel engine of the combine harvester as mentioned above, coupled to the drive roller 102 through a clutch (and gearbox). When driven in the forward direction, other parts of the processing system, in particular the axial rotor 22 (or axial rotors), are geared to rotate with the beater cylinder 14.

The hydraulic motor 104 is used to drive the beater cylinder 14 in the reverse direction "rev". The section of belt acted upon by the belt tensioning element is in this case the taut section of belt, and a greater tensioning force is needed, in particular to prevent belt slippage.

The tensioning force F to be applied, in particular the additional force compared to the force in the forward driver direction, should be a function of the load L on the hydraulic motor, i.e., F=f(L). Since the hydraulic pressure applied to the hydraulic cylinder correlates with (and is proportional to) the force applied by the belt tensioning element 110, the pressure P to be applied to the hydraulic cylinder should be a function of the load L on the hydraulic motor, i.e., P=f(L).

One approach for achieving the desired relationship between the load of the hydraulic motor and the pressure applied to the hydraulic cylinder is to monitor the load using a load sensor, and to drive an actuator to deliver a pressure to the hydraulic cylinder that depends on the monitored load. This is a possible approach, but it requires a sensor, actuator, and controller.

However, another approach avoids the need for sensing and control, and instead provides a simple hydraulic coupling between a fluid supply line to the hydraulic motor and the hydraulic cylinder. This provides a particularly simple solution. The pressure in the fluid supply line will vary in dependence on the load experienced by the hydraulic pump. In particular, the pressure difference between the fluid supply line and a return line (to the hydraulic tank) will self-regulate in dependence on the load on the hydraulic motor. For example, at maximum load, the pressure may be around 20 Mbar, whereas with minimal load the pressure may be around 2 Mbar.

Figure 4A:
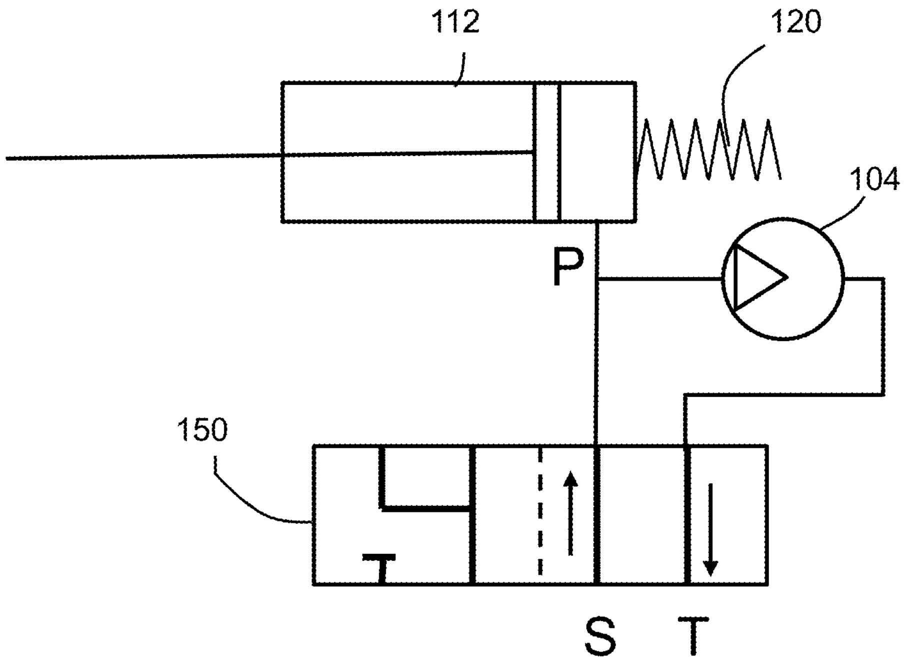
FIGS. 4A and 4B show how the hydraulic motor is connected during forward and reverse driving.

FIG. 4A shows the hydraulic cylinder 112 with the supply pressure P delivered via a valve 150. The valve is positioned so that the hydraulic motor 104 is pressurized by pressure source S and has a return to tank T. This is the valve setting when the hydraulic motor 104 is driving the beater cylinder belt in reverse. The pressure P will depend on the load on the hydraulic motor 104, and hence the hydraulic cylinder pressure and the tensioning force will depend on the load, and in particular, they will be proportional to the load.

Figure 4B:
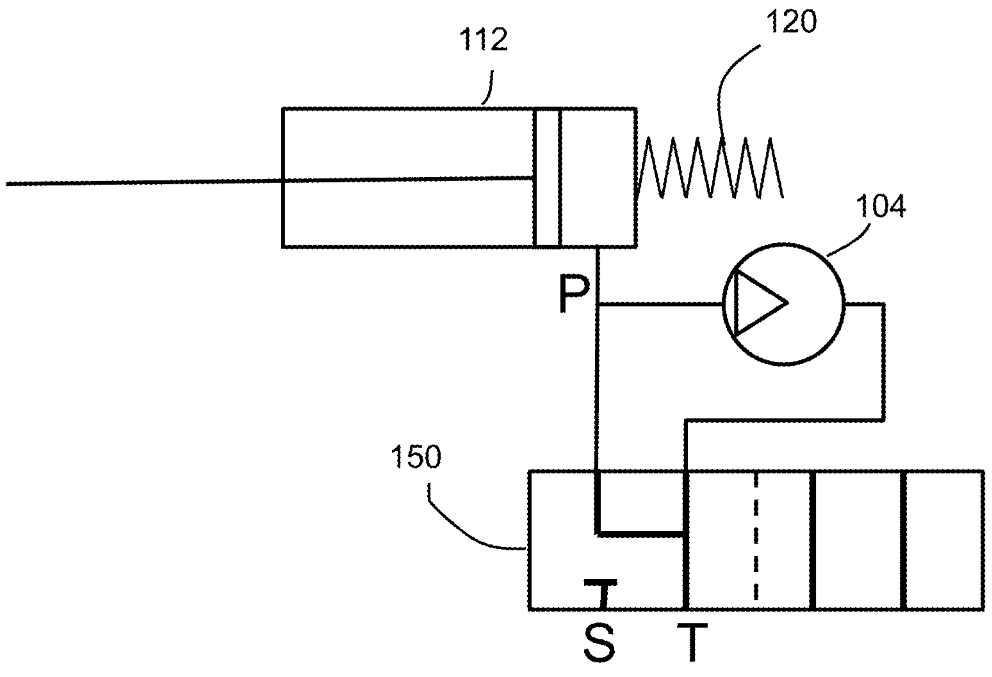

FIG. 4B shows the valve 150 positioned for forward driving. The hydraulic motor 104 is deactivated (its two hydraulic supply lines are coupled together by the valve). The fluid in the hydraulic cylinder returns to the tank, and no (additional) tensioning force is generated by the hydraulic cylinder.

The hydraulic motor 104 is for example also used to drive other processing components in reverse, such as the rotor or rotors 22.

Figure 5:
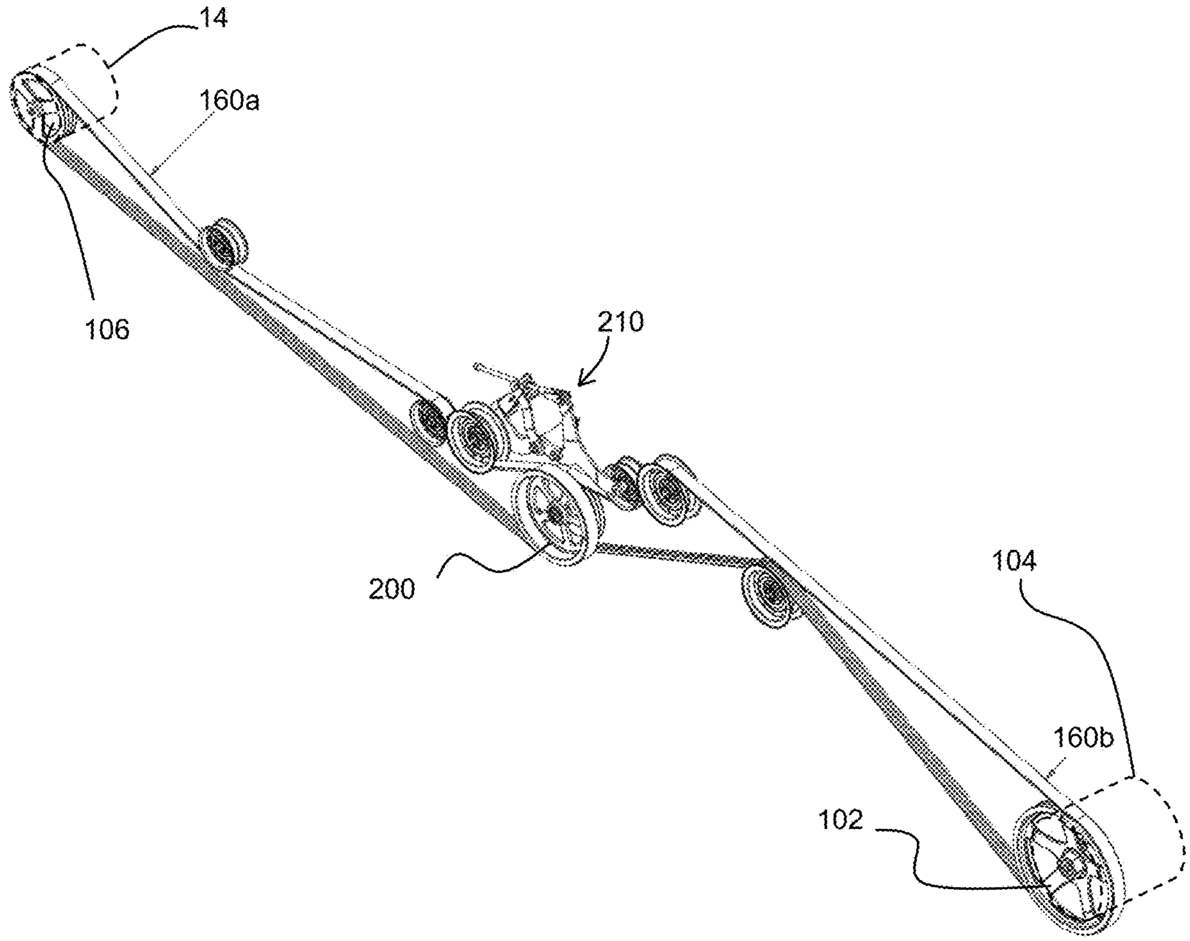
FIG. 5 shows an example of a beater drive belt.

FIG. 5 shows an example of a beater drive belt and tensioning arrangement 210. It has only a single tensioning system (equivalent to the first tensioning system 120 of FIG. 3). The drive belt extends from the rear end of the axial rotor 22 to the front end where the beater cylinder is located. The driven roller 106 drives the beater cylinder 14 and the hydraulic motor 104 is at the opposite end at the drive roller 102.

In this example, there are two belts 160*a*, 160*b* because the length between the rollers 102, 106 is too long for a single belt. A jack shaft 200 is between the drive roller and driven roller. A belt tensioning arrangement 210 is located near the central jack shaft 200 and tensions both belts 160*a*, 160*b*.

Figure 6:
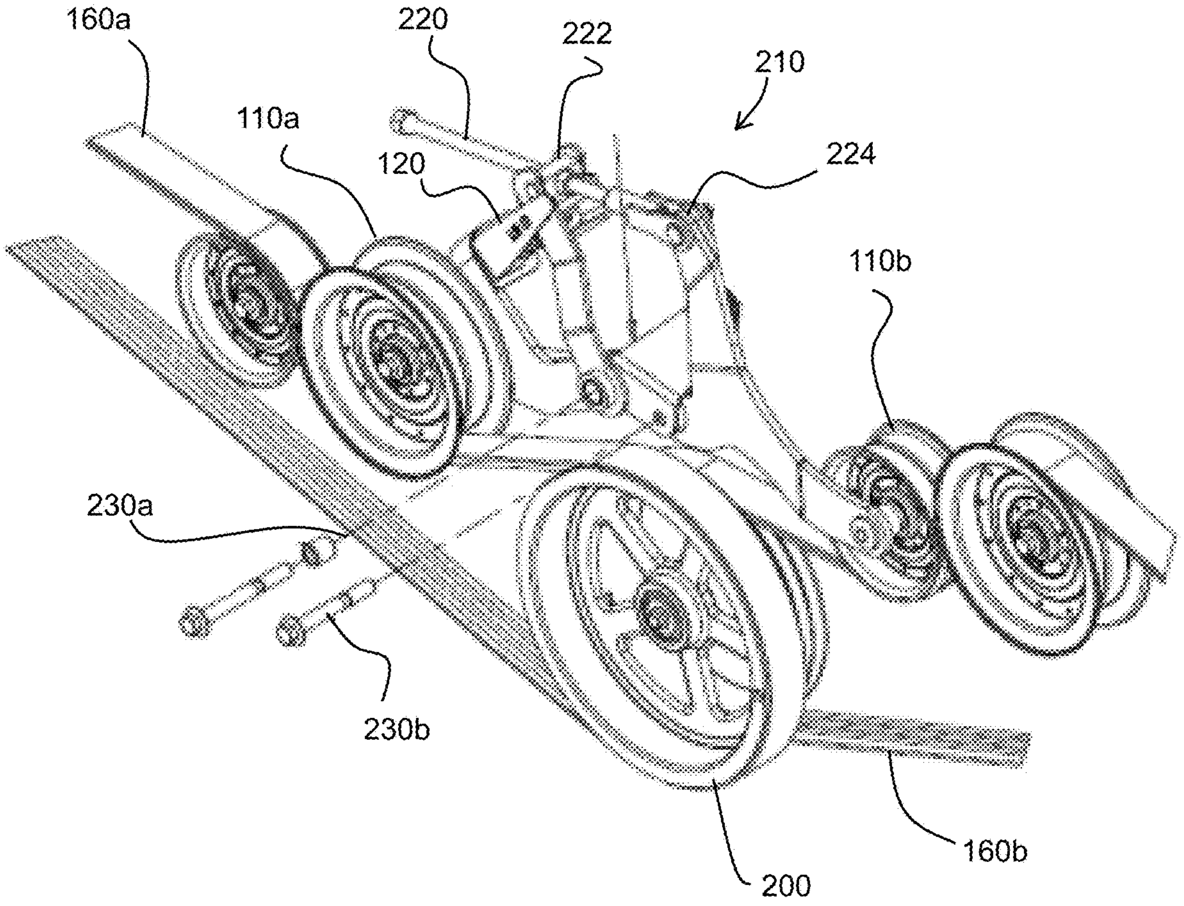
FIG. 6 shows an example of the tensioning system used in the beater drive belt system of FIG. 5.

FIG. 6 shows an example of the tensioning arrangement 210 used in the beater cylinder drive belt system of FIG. 5. The tensioning arrangement has a first belt tensioning element (pulley) 110*a* for the first belt 160*a* and a second belt tensioning element (pulley) 110*b* for the second belt 160*b*. The tensioning arrangement 210 has an adjustment input shaft 220, which enables a pre-bias for the spring of the first (and only) tensioning system 120 to be set. In particular, rotation of the input shaft 220 sets the position of the arm 222 and sets an at-rest length of the spring.

The tensioning arrangement 210 comprises a tensioning system 120 in the form of a spring which basically urges the two belt tensioning elements 110*a*, 110*b* apart from each other so that they each push down on their respective belts. Thus, the tension is set by applying a force between the arms 222 and 224.

The arms 222, 224 of the belt tensioning system are able to rock about respective pivot axes 230*a*, 230*b* so that an equilibrium is reached with equal tensioning forces applied to the two belts, but derived from the single spring 120.

Figure 7:
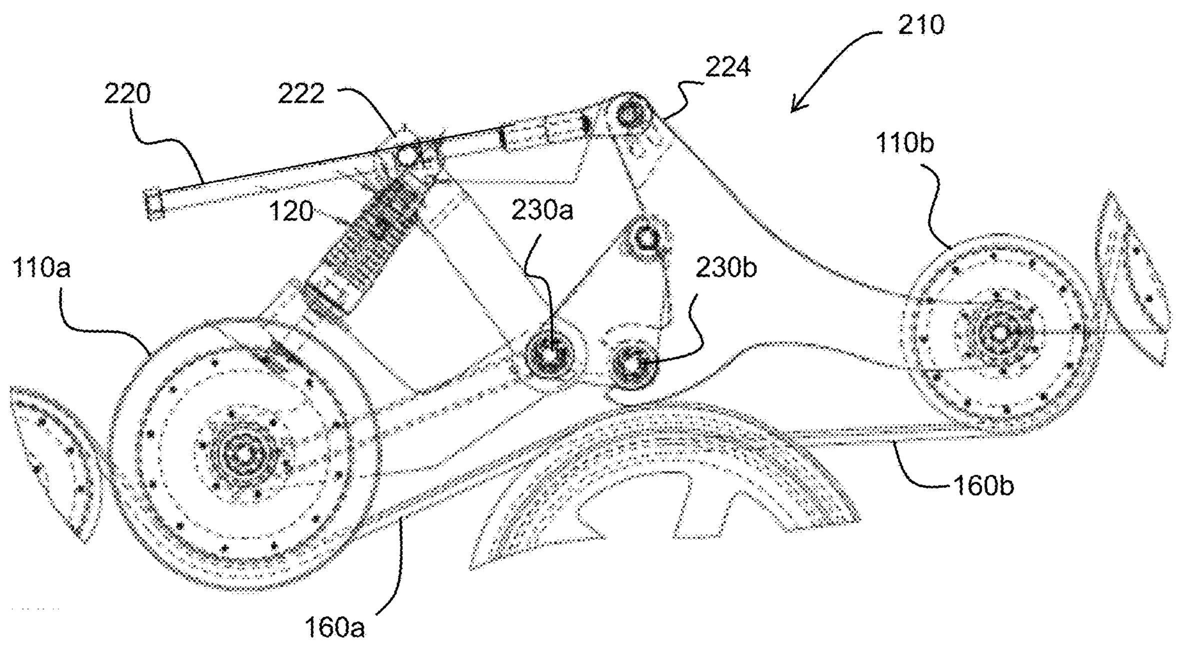
FIG. 7 shows the tensioning system of FIG. 6 more clearly.

FIG. 7 shows the tensioning arrangement of FIG. 6 more clearly in side view.

Figure 8:
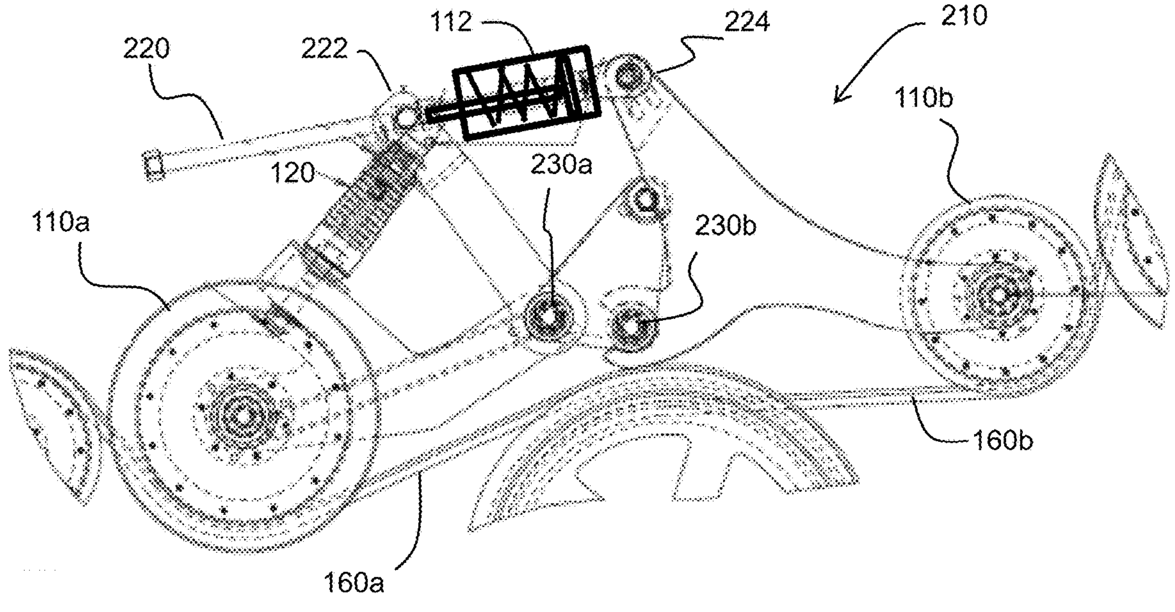
FIG. 8 shows a modification to the tensioning system of FIG. 7.

FIG. 8 shows a modification to the tensioning arrangement of FIG. 7. The second tensioning system is provided, in the form of a hydraulic cylinder 112 between the arms 222, 224. Thus, the force provided by the hydraulic piston acts to push the two arms apart and provide an additional tensioning force compared to the spring force provided by the tensioning arrangement 210 shown in FIG. 7. In other words, the hydraulic piston acts to provide a series additional tensioning force when the hydraulic motor is operated, and that additional force is a function of the load on the hydraulic motor, which may be proportional or substantially proportional to the load on the hydraulic motor.

The main drive motor for driving the belt in the forward direction is disengaged when the hydraulic motor is operated. Thus, the hydraulic motor operates to drive the belt in reverse as well as functioning as the pressure source for actuating the hydraulic piston.

The example above provides belt tensioning of two belts. The arrangement of arms 222, 224 and pivots relates to the use of two belt tensioning elements driven by a single tensioning arrangement. Of course, that is only an example, and the arrangement may be applied to an individual belt, as shown in FIG. 3, or it may be applied to multiple belts with a different arrangement of linkages between the multiple belt tensioning elements.

The example above is for a belt-driven beater cylinder. However, the arrangement may be applied to any belt to be driven in reverse, e.g., to clear a blockage. Different parts of a combine harvester may use this reverse belt drive. For example, a belt-driven feederhouse may use this concept of belt tensioning. Different threshing and separating systems also have different combinations of cylinders and concaves. The belt drive may be applied to any feed cylinder that feeds material from the header to the feederhouse, or from the feederhouse to the threshing system (whether or not it is known as a "beater"), or from the threshing system to the separating system. Thus, any belt-driven cylinder that feeds material along the processing path, and that can be reversed to undo a blockage, may benefit from the concept in this disclosure.

The systems described may also be used in agricultural applications other than combine harvesters, such as hay balers, sugar-beet harvesters, or potato harvesters, or in non-agricultural applications, such as manufacturing processes.

Variations to the disclosed embodiments can be understood and effected by those skilled in the art from a study of the drawings, the disclosure, and the appended claims. The word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to."

All references cited herein are incorporated herein in their entireties. If there is a conflict between definitions herein and in an incorporated reference, the definition herein shall control.

What is claimed is:

1. A drive belt system, comprising:

a drive belt capable of being driven in a forward direction and a reverse direction;

a drive motor arrangement comprising a forward direction drive motor configured to drive the drive belt in the forward direction and a reverse direction drive motor configured to drive the drive belt in the reverse direction, wherein the reverse direction drive motor comprises a hydraulic drive motor;

a belt tensioning element;

a first tensioning system for applying force to the belt tensioning element to apply a tensioning force to the drive belt; and a second tensioning system for applying force to the belt tensioning element to apply a tensioning force to the drive belt, the second tensioning element comprising a hydraulic cylinder;

wherein the hydraulic drive motor comprises a hydraulic pressure supply line;

wherein the hydraulic cylinder is actuated by an input hydraulic pressure; and wherein when the drive system is operated in the reverse direction, the input hydraulic pressure is coupled to the hydraulic pressure supply line of the hydraulic motor and the input hydraulic pressure to the hydraulic cylinder is controlled in dependence on a load on the hydraulic motor wherein the input hydraulic pressure is proportional to the load on the hydraulic motor such that the second tensioning system only adds a force to the belt tensioning element when the drive motor arrangement drives the drive belt in the reverse direction.

2. The drive belt system of claim 1, wherein the first tensioning system comprises a spring system.

3. The drive belt system of claim 1, wherein when the drive system is operated in the forward direction, the first tensioning system only applies the tensioning force, and when the drive system is operated in the reverse direction, the combination of the first and second tensioning systems apply the tensioning force.

4. The drive belt system of claim 1, wherein the hydraulic drive motor comprises a return line, wherein when the drive system is operated in the forward direction, the hydraulic pressure supply line of the hydraulic motor is coupled to the return line.

5. The drive belt system of claim 1, wherein the drive belt system is for driving a beater cylinder of a combine harvester.

6. A combine harvester comprising:

a crop cutting head;

a feederhouse;

a beater cylinder;

the drive belt system of claim 1 configured to drive the beater cylinder;

a threshing system configured to receive material from the beater cylinder;

a separating system; and a grain cleaning system configured to receive cut and threshed crop material.

* * * * *